(12) United States Patent
Cheng et al.

(10) Patent No.: US 11,946,523 B2
(45) Date of Patent: Apr. 2, 2024

(54) WIDEBAND VIBRATION SUPPRESSION DEVICE UTILIZING PROPERTIES OF SONIC BLACK HOLE

(71) Applicant: THE HONG KONG POLYTECHNIC UNIVERSITY, Hong Kong (CN)

(72) Inventors: Li Cheng, Hong Kong (CN); Tong Zhou, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 883 days.

(21) Appl. No.: 16/965,851

(22) PCT Filed: Oct. 17, 2018

(86) PCT No.: PCT/CN2018/110628
§ 371 (c)(1),
(2) Date: Jul. 29, 2020

(87) PCT Pub. No.: WO2019/148891
PCT Pub. Date: Aug. 8, 2019

(65) Prior Publication Data
US 2021/0054898 A1 Feb. 25, 2021

(30) Foreign Application Priority Data
Jan. 30, 2018 (CN) .......................... 201810086724.0

(51) Int. Cl.
*F16F 7/10* (2006.01)
*G10K 11/168* (2006.01)

(52) U.S. Cl.
CPC .............. *F16F 7/10* (2013.01); *G10K 11/168* (2013.01); *F16F 2222/08* (2013.01);
(Continued)

(58) Field of Classification Search
CPC ........ F16F 7/00; F16F 15/005; B60K 5/1283; E04B 1/98; G10K 11/16; G10K 11/17861;
(Continued)

(56) References Cited

U.S. PATENT DOCUMENTS

| 5,485,053 | A | * | 1/1996 | Baz | ........................ | H10N 30/80 310/326 |
| 2006/0106500 | A1 | * | 5/2006 | Allaei | .................... | G05D 19/02 700/280 |

(Continued)

FOREIGN PATENT DOCUMENTS

| CN | 101112118 A | 1/2008 |
| CN | 106021974 A | 10/2016 |

(Continued)

OTHER PUBLICATIONS

English machined translation of CN-106023974, Description only, Oct. 12, 2016.*

(Continued)

*Primary Examiner* — Robert A. Siconolfi
*Assistant Examiner* — San M Aung
(74) *Attorney, Agent, or Firm* — Scully, Scott, Murphy & Presser, P.C.

(57) ABSTRACT

A wideband vibration suppression device utilizing properties of a sonic black hole, comprising: a vibration absorber (101) comprising a uniform portion (1011) of a fixed thickness and a conical portion (1012) integrally connected to the uniform portion (1011), the conical portion (1012) extending from the junction in such a manner that the thickness thereof gradually decreases from the thickness (d1) of the uniform portion (1011) to a predetermined thickness (d2); and a damping layer (102) attached to the conical portion (1012) of the vibration absorber (101).

9 Claims, 6 Drawing Sheets

(52) U.S. Cl.
CPC ..... *F16F 2226/04* (2013.01); *F16F 2226/042* (2013.01); *F16F 2226/048* (2013.01); *F16F 2228/007* (2013.01); *F16F 2228/04* (2013.01); *F16F 2230/18* (2013.01); *F16F 2234/00* (2013.01)

(58) Field of Classification Search
CPC ..... G10K 11/17875; G10K 2210/1282; G10K 2210/1291; G10K 2210/3211; G10K 2210/3224
USPC .......................................................... 188/378
See application file for complete search history.

(56) References Cited

U.S. PATENT DOCUMENTS

| | | | |
|---|---|---|---|
| 2007/0012535 A1* | 1/2007 | Matheny | F16F 9/306 188/266 |
| 2013/0071251 A1 | 3/2013 | Relancio et al. | |
| 2014/0008146 A1* | 1/2014 | Fuhrmann | G10K 11/168 181/294 |
| 2014/0044299 A1 | 2/2014 | Dumay | |
| 2014/0262656 A1* | 9/2014 | Song | E21B 17/01 188/378 |

FOREIGN PATENT DOCUMENTS

| | | |
|---|---|---|
| CN | 106023974 A | 10/2016 |
| CN | 106023978 A | 10/2016 |
| CN | 106023979 A | 10/2016 |
| CN | 108122551 A | 6/2018 |
| DE | 102015100442 A1 | 7/2016 |
| FR | 3 028 906 A1 | 5/2016 |
| FR | 1028906 A1 | 5/2016 |
| WO | 2011/148935 A1 | 12/2011 |
| WO | WO-2019148891 A1 * | 8/2019 ............ F16F 15/02 |

OTHER PUBLICATIONS

International Search Report dated Jan. 18, 2019 issued in PCT/CN2018/110628.

Hongli, Ji et al., "Mechanics problems in application of acoustic black hole structures", Advances in Mechanics (2017), 47: 201710, with English Abstract.

Jeon, Wonju, "Vibration damping using a spiral acoustic black hole", Inter Noise 2016, Hamburg, pp. 2387-2391.

Bowyer E.P. et al., "Effect of Geometrical and Material Imperfections on Damping Flexural Vibrations in Plates With Attached Wedges of Power Law Profile", Applied Acoustics 73:514-523 (2012).

* cited by examiner

WIDEBAND VIBRATION SUPPRESSION DEVICE UTILIZING PROPERTIES OF SONIC BLACK HOLE

CROSS-REFERENCE TO RELATED APPLICATIONS

The present application is a national phase application under 35 U.S.C. § 371 of International Patent Application No. PCT/CN2018/110628, filed on Oct. 17, 2018 which claims priority to Chinese Patent Application No. 201810086724.0, filed on Jan. 30, 2018, the entire contents of both of which are incorporated herein by reference.

TECHNICAL FIELD

The present application relates to the field of vibration reduction, and in particular, to a broadband vibration suppression apparatus using acoustic black hole feature.

BACKGROUND

Vibration control is of great importance for many industrial products such as transportation vehicles, machines and electronic instruments etc. The vibration of structures, devices and machines directly affect the acceptance and the competitive of the products. More and more stringent regulations require the vibrations be limited within an accept level so that the potential problems like fatigue, noise and discomfort can be avoided. Efforts have been persistent in developing ways to reduce undesirable structural or mechanical vibrations.

SUMMARY

The present invention provides a broadband vibration suppression apparatus using an acoustic black hole feature, the apparatus includes: a vibration-reduced body comprising a uniform portion of a fixed thickness and a tapered portion integrally connected with the uniform portion, the tapered portion being extended from a junction in a manner that a thickness of the tapered portion gradually decreases from the fixed thickness of the uniform portion to a predetermined thickness, wherein the uniform portion and the tapered portion being integrally connected at the junction; and a damping layer attached to the tapered portion of the vibration-reduced body.

DETAILED DESCRIPTION

Figure 1:
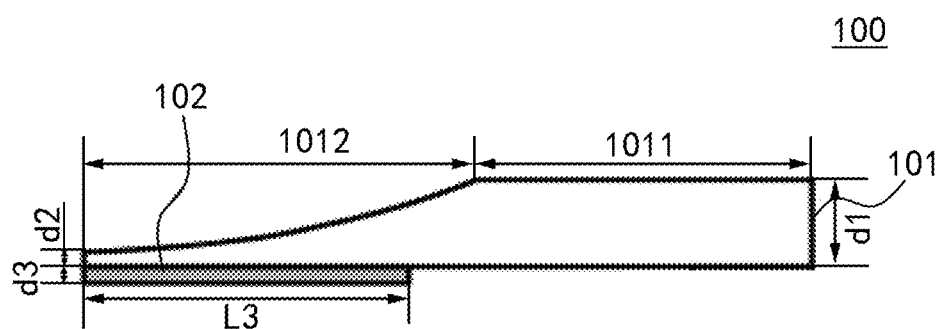
FIG. 1 shows a main view of a broadband vibration suppression apparatus using acoustic black hole feature according to an exemplary embodiment of the present invention.

The embodiments of the present application will be described in detail below. It should be noted that the embodiments described here are only used for illustration and are not used to limit the scope of the application.

One of the popular and efficient methods to control structural vibration is to attach an auxiliary system to an original structure under control. Dynamic vibration absorber (DVA) is one of the most commonly used vibration control device. It usually consists of a mass, a spring and a damping element, structurally integrated into various forms. To reduce the resonant peak of a structure, however, a DVA should be tuned to the exact frequency and attached to the primary vibrating system. By doing so, the vibration level of the original structure can be effectively reduced due the strong interaction between the structure and the DVA. Various absorber inventions based on this principle have been disclosed such as U.S. Pat. No. 3,419,111A etc. However, it is well accepted that the conventional DVA can only provide vibration reductions over a very narrow frequency band and the control performance of the device for vibration reductions is very sensitive to its physical parameters. Therefore, it is a very complex and tedious procedure to tune and apply multiple DVAs for multi-frequency or broadband control. A waveguide absorber is another type of vibration control device. It can increase the damping and energy dissipation of the primary vibration structure to possibly achieve multi-resonance control. However, the coupling between such an auxiliary absorber system (such as a waveguide absorber) and main vibratory system is relatively weak and the waveguide absorber should be designed suitably in order to satisfy the impedance matching condition. Conventional devices have very limited wave-trapping and energy dissipating capability, unless impractically large structures with special design are used. Meanwhile, the attachment location and the number of absorbers should be chosen with care to produce sufficient vibration reduction effects in practical applications. Therefore, there is a need to develop a simple and easy-to-use vibration control device for effective broadband vibration suppressions.

It can be seen from the above that the conventional dynamic vibration absorber can only provide vibration suppression within a very narrow range, and the control performance is very sensitive to the physical parameters of the vibration absorber. Tuning parameters is also cumbersome and difficult. Although the waveguide absorber can be effective over a wide frequency band, the coupling between this auxiliary system and the primary vibration structure is relatively weak. The design of the waveguide absorber should be appropriate, and attention should be paid to satisfying the impedance matching conditions. In practical applications, multiple absorbers are usually required.

The present invention provides a broadband vibration suppression apparatus using acoustic black hole feature and the broadband vibration suppression apparatus using acoustic black hole feature is used as an auxiliary additional apparatus, thereby achieving broadband vibration suppression of the primary structure by using a minimal adjustment, that is, reduces the unwanted vibrations of the primary structure over a broad frequency band. The design procedure of such attached sub-device is expected to be simple and easy to be applied in various applications.

In the present disclosure, a broadband effective vibration absorber is designed by using the 'Acoustic Black Hole' (ABH) phenomenon, so as to reduce various types of undesired structural vibrations, especially the flexural vibrations of the primary structure, and to reduce noise. In the ABH structure, as flexural waves propagate within a tapered wedge with its thickness tailored to decrease according to a power function ($h(x)=\varepsilon \cdot x^m$, $m \geq 2$), the wave speed of the flexural waves reduces gradually and the wave amplitude increases progressively, wherein x is a coordinate along a direction in which the thickness of the tapered wedge gradually decreases, $\varepsilon$ is a coefficient, and m is an integer greater than or equal to 2.

The proposed vibration suppression apparatus with ABH feature has its own inherent characteristics of large working frequency band and effective control performance In related techniques, the ABH features are embedded within original vibration structures in various forms through reducing the thickness of original vibration structures, which deteriorate the static properties of original vibration structures. However, the present invention seeks way to design an add-on vibration suppression apparatus without affecting the mechanical properties of the original vibration structure itself. That is, the present invention attaches the ABH tapered structure element as an independent device to the original vibration structure, so it does not sacrifice the completeness and stiffness of the original vibration structure.

FIG. 1 shows a main view of a broadband vibration suppression apparatus using acoustic black hole feature according to an exemplary embodiment of the present invention.

As shown in FIG. 1, the vibration suppression apparatus 100 may include a vibration-reduced body 101, i.e. tapered add-on beam, and a damping layer 102. The vibration-reduced body 101 includes a uniform portion 1011 of a fixed thickness and a tapered portion 1012 integrally connected with the uniform portion 1011. The tapered portion 1012 extends from a junction where the tapered portion 1012 integrally connects with the uniform portion 1011 in a manner that the thickness of the tapered portion 1012 gradually decreasing from the thickness d1 of the uniform portion 1011 to a predetermined thickness d2. The damping layer 102 is configured to attach to the tapered portion 1012 of the vibration-reduced body 101.

The thickness variation of the tapered portion 1012 follows the following power-law profile $h(x)=\varepsilon \cdot x^m$, $m \geq 2$, wherein x is a coordinate along a direction in which the thickness of the tapered portion gradually decreases, $\varepsilon$ is a coefficient, and m is an integer greater than or equal to 2. However, the present invention is not limited to this. For example, the thickness variation of the tapered portion 1012 can also follow other similar formulas, as long as the thickness of the tapered portion 1012 is gradually reduced to meet the so-called "smoothness criterion", that is, the local wavenumber changes small in wavelength distance, the effect similar to the present invention can be obtained.

In addition, the thickness of the tapered portion 1012 is gradually reduced to the predetermined thickness d2 and then is stopped due to the truncation of the tapered portion 1012, thereby generating strong wave reflection at the truncation. To solve this problem, the present invention uses the damping layer 102 to cover a tip of the tapered portion 1012, so that the wave reflection caused by the truncation can be significantly reduced. As a result, the combination of the tapered portion 1012 with a varying thickness and the damping layer 102 results in an effective wedge-like absorber, which can more effectively absorb vibration and reduce noise.

The additional damping layer 102 reduces the reflection of incident waves and provides energy dissipation for the vibration-reduced body 101. Generally, a viscoelastic material with a high loss factor can be selected as the additional damping layer 102.

As shown in FIG. 1, the damping layer 102 is attached (for example, bonded) over a bottom surface of the tip of the tapered portion 1012 of the vibration-reduced body 101. However, the present invention is not limited to this. For example, the damping layer 102 may also be provided on the top surface of the tip of the tapered portion 1012. In this case, the damping layer 102 has a curved surface that is consistent with the change of the top surface of the tip of the tapered portion 1012, in order to match the top surface of the tip of the tapered portion 1012. The damping layer 102 may also be attached to the middle part of the top surface or the bottom surface of the vibration-reduced body 101, or the left part thereof, instead of being flush with the tip of the tapered portion 1012 as shown in FIG. 1.

In an example, the damping layer 102 may be multiple layers. That is, on the basis of the damping layer 102 shown in FIG. 1, another damping layer with the same shape or a different shape may be further provided. For example, another damping layer may be further provided on the damping layer 102, or another damping layer may be further provided on the top surface of the tip of the tapered portion 1012 to further reduce the reflection of the incident wave and provide further energy dissipation for the vibration-reduced body 101.

The uniform portion 1011 and the tapered portion 1012 are formed as one body (i.e., integrally formed), and the materials of the two portions are the same. The uniform portion 1011 and the tapered portion 1012 may be formed by numerical control milling, or 3D printing (which may be used for one-time molding), or electrical discharge machining, for example.

Figure 1A:
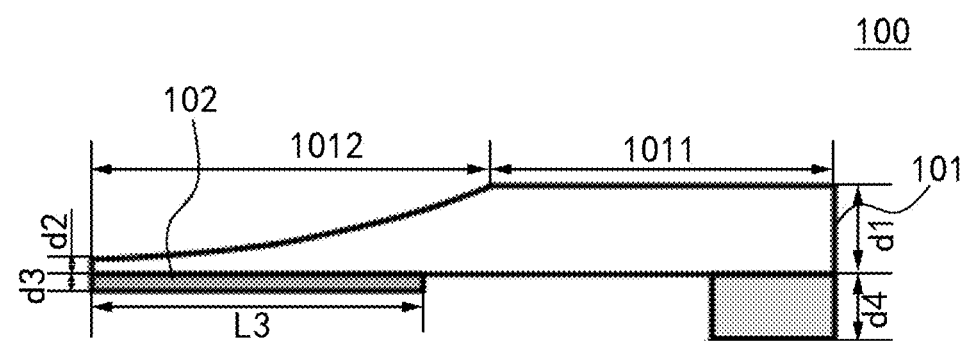
FIG. 1A shows a front view of a variation of a broadband vibration suppression apparatus using acoustic black hole feature according to an exemplary embodiment of the present invention.

FIG. 1A shows a front view of a variation of a broadband vibration suppression apparatus using acoustic black hole feature according to an exemplary embodiment of the present invention.

As shown in FIG. 1A, based on the vibration suppression apparatus 100 shown in FIG. 1, the vibration suppression apparatus 100 may further include a connector 103. The connector 103 is attached to the bottom of the uniform portion 1011 of the vibration-reduced body 101. The connector 103 is used to connect the vibration-reduced body 101 to a device to be vibration-reduced (i.e., the original vibration structure).

Figure 2:
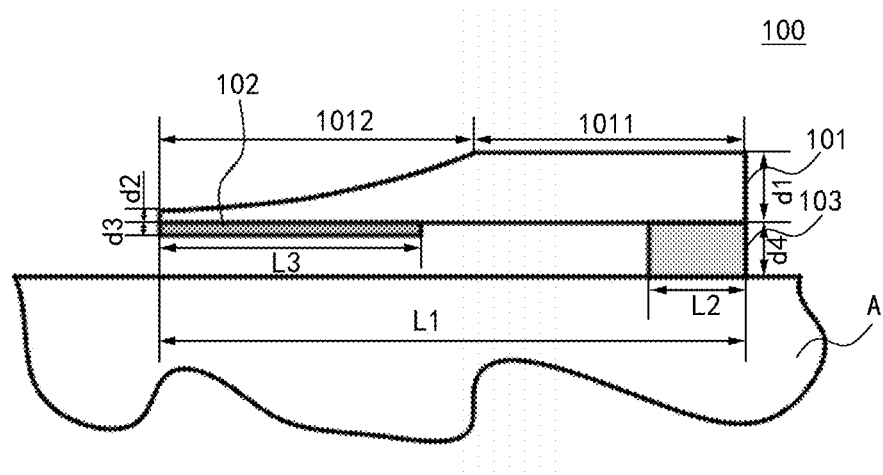
FIG. 2 shows a schematic diagram of installing a vibration suppression apparatus to a device to be vibration-reduced according to an embodiment of the present invention.

FIG. 2 shows a schematic diagram of installing a vibration suppression apparatus to a device to be vibration-reduced according to an embodiment of the present invention.

As shown in FIG. 2, the connector 103 is attached to the bottom of the uniform portion 1011 of the vibration-reduced body 101 of the vibration suppression apparatus 100, so as to connect the vibration suppression apparatus 100 to a device A to be vibration-reduced.

The connector 103 is used to connect a primary vibration system (i.e., the device A to be vibration-reduced) and the auxiliary vibration system (i.e., the vibration-reduced body 101), so that the vibration energy can be transferred between the device A to be vibration-reduced and the vibration-reduced body 101 (and thus the vibration suppression apparatus 100) through local displacement and rotation. For example, the connector 103 can connect the vibration-reduced body 101 to the device A to be vibration-reduced by means of strong glue, welding or bolts, etc.

In an example, if the length of the uniform portion 1011 of the vibration-reduced body 101 is relatively small, the connector 103 (as shown in FIG. 1) can also be omitted, and the vibration-reduced body 101 can be directly connected with the device A to be vibration-reduced by means of strong glue, welding or bolts, etc.

As shown in FIG. 2, the thickness of the connector 103 is d4, the thickness of the damping layer 102 is d3, and d4 is greater than d3.

The vibration of the device A to be vibration-reduced (i.e. primary vibration system) causes the propagations of flexural waves in the vibration suppression apparatus 100. According to the power law profile, the thickness of the vibration-reduced body 101 of the vibration suppression apparatus 100 is adjusted from an original large value d1 to a small value d2. Then, due to the specific "acoustic black hole" effect, the vibration energy is shifted from the thick part to the thin part of the vibration-reduced body 101 and concentrated around the extended tip of the tapered portion 1012 of the vibration-reduced body 101.

The thickness d2 of the extended tip of the tapered portion 1012 of the vibration-reduced body 101 should be as small as possible, as long as the vibration-reduced body 101 can hold the damping layer 102 without breaking the vibration-reduced body 101 and ensure that the damping layer 102 does not contact the device A to be vibration-reduced. The smaller the thickness d2 of the extended tip of the tapered portion 1012 of the vibration-reduced body 101 is, the better the control effect has.

Preferably, the residual thickness d2 of the tip (i.e., the truncated portion) of the tapered portion 1012 of the vibration-reduced body 101 may be several tens of times smaller than the thickness d1 of the uniform portion of the vibration-reduced body 101.

In addition, the additional vibration suppression apparatus 100 with an acoustic black hole feature has rich dynamics (distribution form), that is, it has a rich modal distribution in the frequency spectrum and has a high system loss factor in a wide frequency band. When the frequency matching condition is met, the vibration suppression apparatus 100 and the device A to be vibration-reduced will also interact with each other simultaneously, and the vibration of the device A to be vibration-reduced near the matching frequency is reduced by the principle of DVA.

The vibration suppression apparatus 100 can be attached to the device A to be vibration-reduced as an auxiliary system to reduce its vibration over a wide frequency band. In an example, a plurality of vibration suppression apparatus 100 may be connected to the device A to be vibration-reduced, so as to further effectively reduce the vibration of the device A to be vibration-reduced and reduce noise.

Figure 2A:
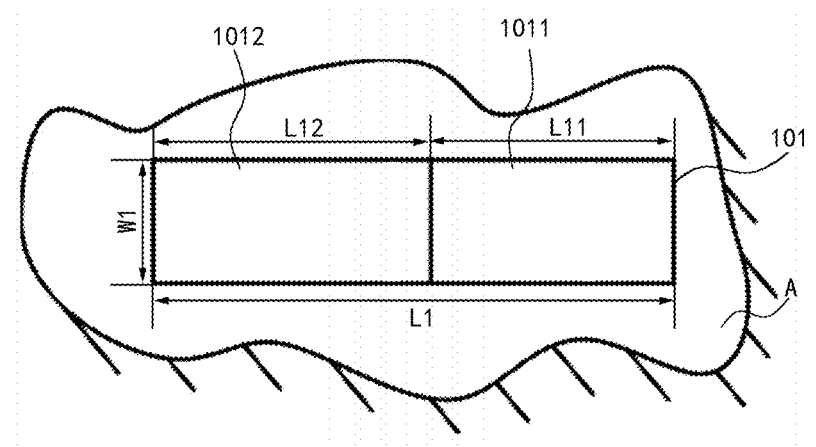
FIG. 2A shows a top view of the vibration suppression apparatus and the device to be vibration-reduced shown in FIG. 2.

FIG. 2A shows a top view of the vibration suppression apparatus and the device to be vibration-reduced shown in FIG. 2.

As shown in FIG. 2A, the length of the vibration-reduced body 101 is L1, the length of the uniform portion 1011 is L11, and the length of the tapered portion 1012 is L12, where L1=L11+L12. The widths of the uniform portion 1011 and the tapered portion 1012 are both w1.

Figure 2B:
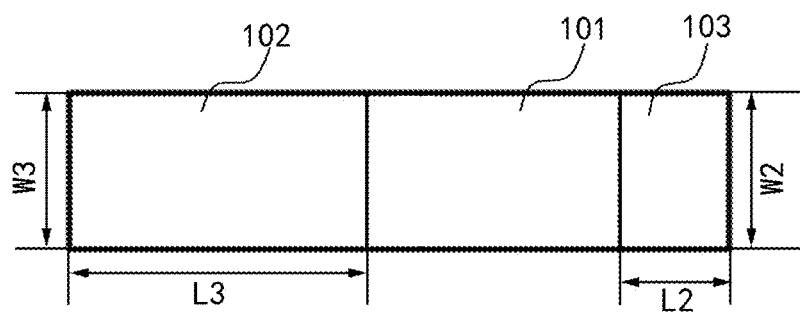
FIG. 2B shows a bottom view of the vibration suppression apparatus shown in FIG. 1A.

FIG. 2B shows a bottom view of the vibration suppression apparatus shown in FIG. 1A.

As shown in FIG. 2B, the length of the connector 103 is L2, the length of the damping layer 102 is L3, and both L2 and L3 are less than L1. Preferably, L2 is smaller than L11, and L3 is smaller than L12. However, the present invention is not limited to this. For example, L3 can also be greater than L12. The width of the connector 103 is w2, and the width of the damping layer is w3. Preferably, w1=w2=w3. However, the present invention is not limited to this. For example, w2 and w3 can also be smaller than w1.

Referring to FIG. 2 and FIG. 2B, the connector 103 may be a rectangular solid. However, the present invention is not limited to this, and the connector 103 may also have other shapes, such as a cube, an ellipsoid, and the like.

Referring to FIG. 1 to 2B, a neutral axis of the tapered portion 1012 is linear, that is, the neutral axis of the tapered portion 1012 extends in a way of straight line from the uniform portion 1011, and its thickness gradually decreases from d1 to d2. However, the present invention is not limited to this. The tapered portion 1012 may also extend in other forms. For example, the tapered portion 1012 may extend in a spiral shape, which will be described in detail later with reference to FIG. 5.

As shown in FIGS. 1, 1A, 2, 2A, and 2B, the design of the vibration suppression apparatus according to the exemplary embodiment of the present invention is relatively simple.

In addition, due to the uniqueness of the acoustic black hole (ABH) phenomenon, the vibration suppression apparatus of the present invention can unify the principles of the dynamic vibration absorber and the waveguide absorber to form a single device, so that the vibration suppression apparatus of the present invention can simultaneously have the advantages of both the dynamic vibration absorber and the waveguide absorber.

Figure 3:
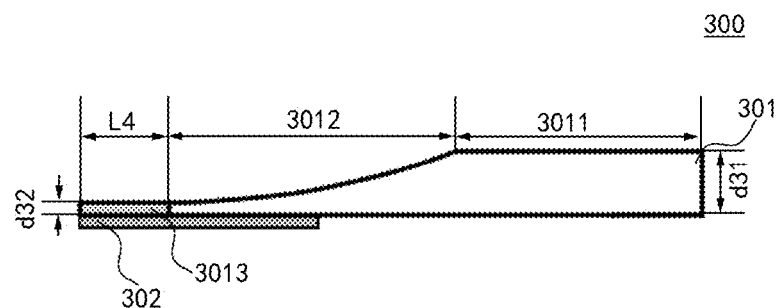
FIG. 3 shows a main view of a vibration suppression apparatus according to another exemplary embodiment of the present invention.

FIG. 3 shows a main view of a vibration suppression apparatus 300 according to another exemplary embodiment of the present invention. Similar to the vibration suppression apparatus 100 shown in FIG. 1, the vibration suppression apparatus 300 according to this embodiment also includes a vibration-reduced body 301 and a damping layer 302. The vibration-reduced body 301 includes a uniform portion 3011 of a fixed thickness and a tapered portion 3012 integrally connected with the uniform portion 3011. The tapered portion 3012 extends from a junction in a manner that the thickness thereof gradually decreasing from the thickness d31 of the uniform portion 3011 to a predetermined thickness d32. The tapered portion 3012 integrally connects with the uniform portion 3011 at the junction. The damping layer 102 is configured to attach to the tapered portion 3012 of the vibration-reduced body 301.

Figure 3A:
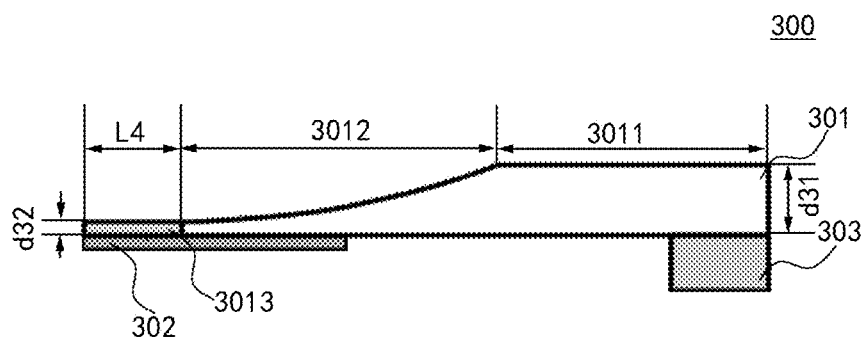
FIG. 3A shows a main view of a variation of the vibration suppression apparatus shown in FIG. 3.

FIG. 3A shows a main view of a variation of the vibration suppression apparatus shown in FIG. 3. As shown in FIG. 3A, based on the vibration suppression apparatus 300 shown in FIG. 3, the vibration suppression apparatus 300 may further include a connector 303. The connector 303 is attached to a bottom of the uniform portion 3011 of the vibration-reduced body 301, so as to connect the vibration-reduced body 301 with a device to be vibration-reduced (not shown).

Referring to FIGS. 3 and 3A, the thickness decreasing of the tapered portion 1012 follows the power-law profile shown below:

$$h(x)=\varepsilon \cdot x^m, m \geq 2,$$

wherein x is a coordinate along a direction in which the thickness of the tapered portion gradually decreases, ε is a coefficient, and m is an integer greater than or equal to 2.

The thickness variation of the tapered portion 3012 can also follow other similar formulas, as long as the thickness of the tapered portion 3012 is gradually reduced to meet the so-called "smoothness criterion", the effect similar to the present invention can be obtained.

In addition, the thickness of the tapered portion 3012 is gradually reduced to the predetermined thickness d32 and then is stopped due to the truncation of the tapered portion 3012, thereby generating strong wave reflection at the truncation. To solve this problem, the present invention uses the damping layer 302 to cover the tip of the tapered portion 3012, so that the wave reflection caused by the truncation can be significantly reduced. As a result, the combination of a tapered portion 3012 with a varying thickness and a damping layer 302 results in an effective wedge-like absorber, which can more effectively absorb vibration and reduce noise.

The damping layer 302 may attached over a top surface or a bottom surface of the extended tip of the tapered portion 3012 of the vibration-reduced body 301. In this way, the wave reflection caused by the extension and truncation of the tapered portion 3012 can be significantly reduced. As a result, the combination of a tapered portion 3012 with a varying thickness and a damping layer 302 results in an effective wedge-like absorber, which can more effectively absorb vibration and reduce noise.

The additional damping layer 302 reduces the reflection of incident waves and provides energy dissipation for the vibration-reduced body 301. Generally, a viscoelastic material with a high loss factor can be selected as the additional damping layer 302.

The connector 303 is used to connect a primary vibration system (i.e., the device to be vibration-reduced) and the auxiliary vibration system (i.e., the vibration-reduced body 301), so that the vibration energy can be transferred between the device A to be vibration-reduced and the vibration-reduced body 301 (and thus the vibration suppression apparatus 300) through local displacement and rotation. For example, the connector 303 can connect the vibration-reduced body 301 to the device to be vibration-reduced by means of strong glue, welding or bolts, etc.

In an example, if the length of the uniform portion 3011 of the vibration-reduced body 301 is relatively small, the connector 303 can also be omitted, and the vibration-reduced body 301 can be directly connected with the device to be vibration-reduced by means of strong glue, welding or bolts, etc.

The neutral axis of the tapered portion 3012 may be a linear shape or a spiral shape.

The difference between the vibration suppression apparatus 300 according to this embodiment and the vibration suppression apparatus 100 shown in FIG. 1 is that the vibration-reduced body 301 of the vibration suppression apparatus 300 according to the present embodiment further includes a platform 3013 which is formed by the extended tip of the tapered portion 3012 of the vibration-reduced body 301 continuing to extend with the predetermined thickness d32 for a predetermined length.

The platform 3013 extends a certain length L4 from the tip of the tapered portion 3012 of a constant thickness d32, so that the ABH effect can be enhanced. By doing so, a part of the tapered portion 3012 having a thinner thickness is prolonged and the flexural waves have large vibration amplitude at this part of tapered portion 3012, so that the flexural waves can be better attenuated through the prolonged portion. In addition, the low frequency performance of the vibration suppression apparatus is also improved.

The uniform portion 3011, the tapered portion 3012, and the platform 3013 are formed as one body (i.e., integrally formed), and the materials of the three are the same. The uniform portion 3011, the tapered portion 3012, and the platform 3013 can be formed by, for example, numerical control milling, 3D printing (which may be used for one-time molding), or electronic electrical discharge machining As shown in FIG. 3, the damping layer 302 is attached over a bottom surface of the tip of the tapered portion 3012 of the vibration-reduced body 301. However, the present invention is not limited to this. For example, the damping layer 302 may also be provided on the top surface of the tip of the tapered portion 3012. In this case, the damping layer 302 has a curved surface that is consistent with the change of the top surface of the tip of the tapered portion 3012, in order to match the top surface of the tip of the tapered portion 3012. The damping layer 302 may also be attached to the middle part of the top surface or the bottom surface of the vibration-reduced body 301, or the left part thereof, instead of being flush with the extended tip of the tapered portion 3012 as shown in FIG. 3.

In an example, the damping layer 302 may be multiple layers. That is, on the basis of the damping layer 302 shown in FIG. 3, another damping layer with the same shape or a different shape may be further provided. For example, another damping layer may be further provided on the damping layer 302, or another damping layer may be further provided on the top surface of the tip of the tapered portion 3012 to further reduce the reflection of the incident wave and provide further energy dissipation for the vibration-reduced body 301.

Figure 4A:
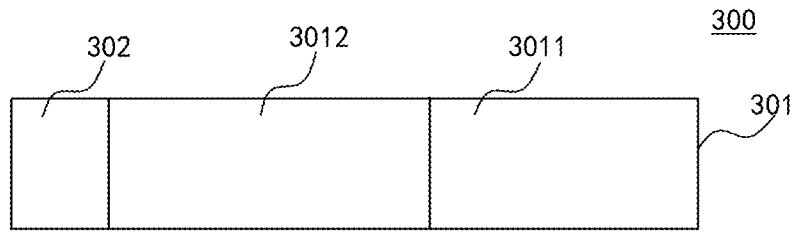
FIG. 4A shows a top view of the vibration suppression apparatus shown in FIG. 3.

FIG. 4A shows a top view of the vibration suppression apparatus shown in FIG. 3.

As shown in FIG. 4A, the length of the vibration-reduced body 301 is equal to the sum of the length of the uniform portion 3011, the length of the tapered portion 3012, and the length L4 of the platform 3013. The width of the uniform portion 3011, the width of the tapered portion 3012, and the width of the platform 3013 may be the same.

Figure 4B:
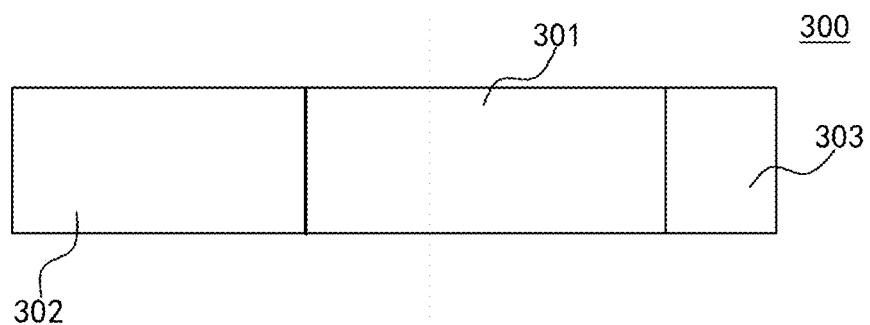
FIG. 4B shows a bottom view of the vibration suppression apparatus shown in FIG. 3A.

FIG. 4B shows a bottom view of the vibration suppression apparatus shown in FIG. 3A.

As shown in FIG. 4B, the length of the connector 303 and the length of the damping layer 302 are both smaller than the length of the vibration-reduced body 301. Preferably, the length of the connector 303 is smaller than the length of the uniform portion 3011, and the length of the damping layer 302 is smaller than the length of the tapered portion 3012. However, the present invention is not limited to this. For example, the length of the damping layer 302 may also be greater than the length of the tapered portion 3012. FIG. 4B shows that the length of the damping layer 302 is greater than the length of the platform 3013, but the length of the damping layer 302 can also be equal to the length of the platform 3013 or smaller than the length of the platform 3013. The uniform portion 3011, the tapered portion 3012, the platform 3013, the connector 303, and the damping layer 302 may have the same width. However, the present invention is not limited to this. For example, the widths of the uniform portion 3011, the tapered portion 3012 and the platform 3013 are equal, while the width of the connector 303 and the width of the damping layer 302 are smaller than the width of the uniform portion 3011.

The vibration of the device to be vibration-reduced (i.e. primary vibration system) causes the propagations of flexural waves in the vibration suppression apparatus 300. According to the power law profile, the thickness of the vibration-reduced body 301 of the vibration suppression apparatus 300 is adjusted from an original large value d31 to a small value d32. Then, due to the specific "acoustic black hole" effect, the vibration energy is shifted from the thick part to the thin part of the vibration-reduced body 301 and concentrated around the platform 3012 of the vibration-reduced body 301.

The thickness d32 of the platform 3013 of the vibration-reduced body 301 should be as small as possible, and the extension length should be as long as possible, as long as the damping body 301 can hold the damping layer 302 without breaking the damping body 301, and ensure that the damping layer 302 does not contact the device to be vibration-reduced. The smaller the thickness d32 of the platform 1013 of the damping body 301 is, the better the control effect has.

Preferably, the residual thickness d32 of the tip (i.e., the truncated portion) of the tapered portion 3012 of the vibration-reduced body 301, that is, the thickness of the platform 3013, may be several tens of times smaller than the thickness d31 of the uniform portion of the vibration-reduced body 301.

Referring to FIGS. 3 and 4B, the connector 303 may be a rectangular solid However, the present invention is not limited to this, and the connector 303 may also have other shapes, such as a cube, an ellipsoid, and the like.

Referring to FIGS. 3 to 4B, a neutral axis of the tapered portion 3012 is a linear shape, that is, the neutral axis of the tapered portion 3012 extends in a way of straight line from the uniform portion 3011, and its thickness gradually decreases from d31 to d32. However, the present invention is not limited to this. The tapered portion 3012 may also extend in other forms. For example, the tapered portion 3012 may extend in a spiral shape, which will be described in detail later with reference to FIG. 5.

In addition, the additional vibration suppression apparatus 300 with an acoustic black hole feature has rich dynamics (distribution form), that is, it has a rich modal distribution in the frequency spectrum and has a high system loss factor in a wide frequency band. When the frequency matching condition is met, the vibration suppression apparatus 300 and the device to be vibration-reduced will also interact with each other simultaneously, and the vibration of the device to be vibration-reduced near the matching frequency is reduced through the principle of DVA.

The vibration suppression apparatus 300 can be attached to the device to be vibration-reduced as an auxiliary system to reduce its vibration over a wide frequency band. In an example, a plurality of vibration suppression apparatus 300 may be connected to the device to be vibration-reduced, so as to further effectively reduce the vibration of the device A to be vibration-reduced and reduce noise.

As shown in FIGS. 3 to 4B, the design of the vibration suppression apparatus according to the exemplary embodiment of the present invention is relatively simple.

In addition, due to the uniqueness of the acoustic black hole (ABH) phenomenon, the vibration suppression apparatus of the present invention can unify the principles of the dynamic vibration absorber and the waveguide absorber to form a single device, so that the vibration suppression apparatus of the present invention can simultaneously have the advantages of both the dynamic vibration absorber and the waveguide absorber.

Figure 5:
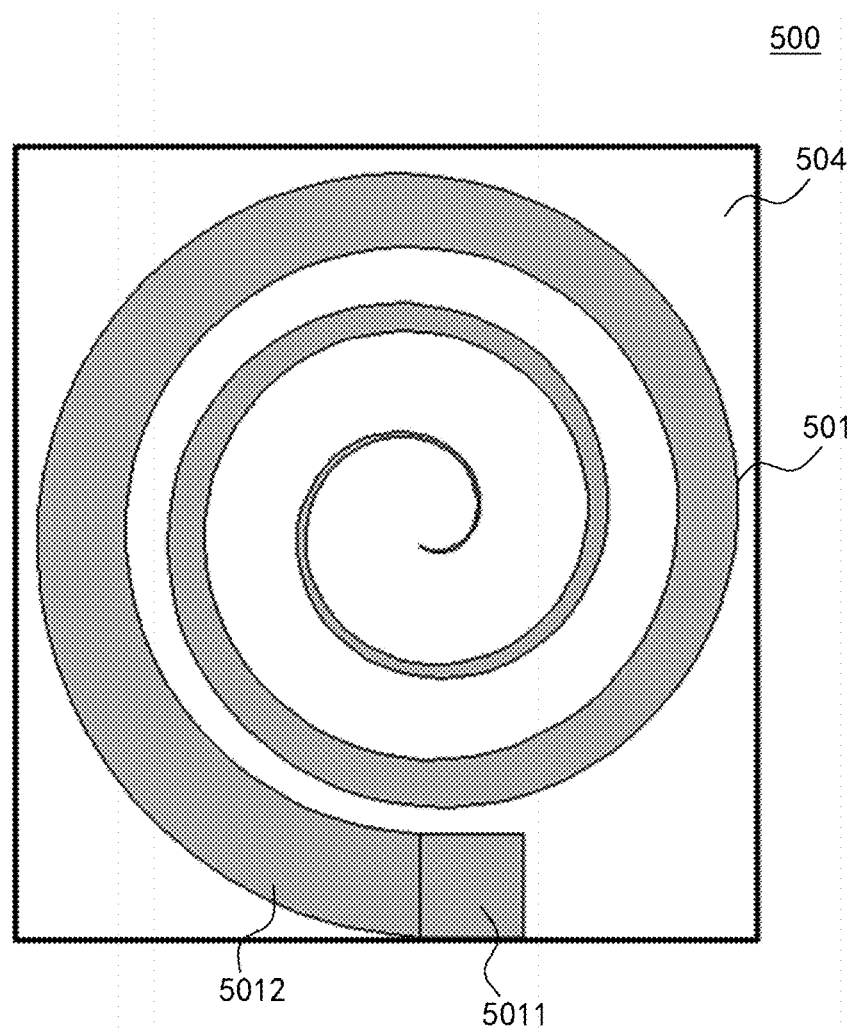
FIG. 5 shows a top view of a vibration suppression apparatus according to still another exemplary embodiment of the present invention.

FIG. 5 shows a top view of a vibration suppression apparatus according to still another exemplary embodiment of the present invention.

As shown in FIG. 5, the vibration suppression apparatus 500 may include a vibration-reduced body 501, i.e. tapered add-on beam, and a damping layer (not shown). The vibration-reduced body 501 contains a uniform portion 5011 of a fixed thickness and a tapered portion 5012 integrally connected with the uniform portion 5011. The tapered portion 5012 extends from a junction where the tapered portion 5012 integrally connects with the uniform portion 5011 in a manner that the thickness of the tapered portion 5012 gradually decreasing from the thickness of the uniform portion 5011 to a predetermined thickness. The damping layer is configured to attach to the tapered portion 5012 of the vibration-reduced body 501.

The vibration suppression apparatus 500 may further include a connector (not shown). The connector is attached to the bottom of the uniform portion 5011 of the vibration-reduced body 501. The connector is used to connect the vibration-reduced body 501 to a device to be vibration-reduced (not shown).

Contents similar to those of the vibration suppression apparatus 500 according to this embodiment and the vibration suppression apparatus 100 shown in FIG. 1 will not be repeated. The difference between the two is that the neutral axis of the tapered portion 5012 of the vibration suppression apparatus 500 according to this embodiment is rotated to a curved shape, that is, the neutral axis of the tapered portion 5012 is formed in a spiral shape. In addition, the additional vibration suppression apparatus 500 can be packaged in the box 504 because it rotates in a curved shape to make its structure more compact.

Because the rotation of the neutral axis has little effect on the expected acoustic black hole effect, the curve design of acoustic black holes can be introduced to replace linear acoustic black holes. By rotating the tapered portion 5012 into a curved shape, the overall length of the vibration suppression apparatus 500 can be reduced, so that the vibration suppression apparatus 500 can be placed in a box to save space and improve ABH efficiency. In addition, in one example, a damping layer and a damping fluid can be used to dissipate the vibration energy in the box.

According to the present invention, the acoustic black hole feature is embedded into the vibration suppression apparatus (i.e., vibration control apparatus). The vibration suppression apparatus includes a tapered additional element with an ABH thickness profile (the tapered additional element can be a beam, which can be straight or curved), an additional damping layer and a connector. The damping layer is adhered to the surface of the thin portion of the tapered additional beam, and the damping layer has a small cross-sectional thickness.

The invention can realize the combined control effect of the dynamic vibration absorber and the waveguide absorber, and reduce the vibration level of the primary vibration structure over a wide frequency band. The design process of the invention is simple and easy to be applied to various occasions.

Figure 6:
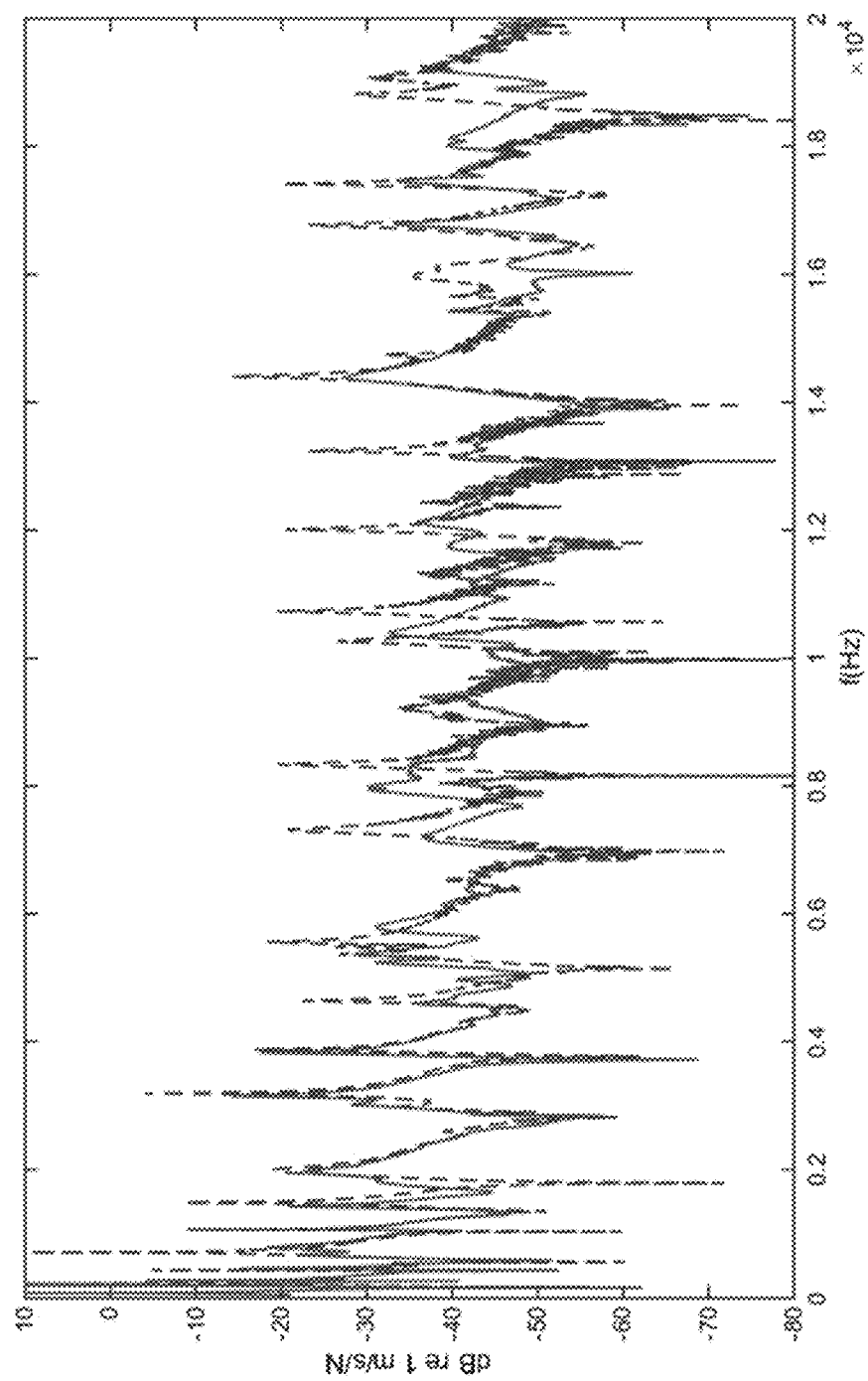
FIG. 6 shows experimental measured results of frequency response of arbitrarily selected device to be vibration-reduced using and without using a vibration suppression apparatus having acoustic black hole feature.

FIG. 6 shows experimental measured results of frequency response of arbitrarily selected device to be vibration-reduced using and without using a vibration suppression apparatus having acoustic black hole feature.

FIG. 6 shows the vibration control effect of the vibration suppression apparatus using the acoustic black hole feature, which is shown by performing experimental measurements. The vibration suppression apparatus is linear and has no additional platform. The vibration suppression apparatus is connected to arbitrarily selected device to be vibration-reduced (for example, uniform main beam) via a connector by using super glue. A plurality of damping layers is connected to the tapered portion. One free end of the device to be vibration-reduced was clamped and a point excitation was applied. FIG. 6 shows the driving point response of the device to be vibration-reduced in case of the vibration suppression apparatus is not connected (dotted line: "--") and the vibration suppression apparatus is connected (solid line: "-").

The horizontal axis of FIG. 6 represents the frequency, and the vertical axis thereof represents the resonance peak. It can be seen from FIG. 6 that the resonance peaks over the broad frequency band are suppressed effectively except for some specific frequencies and the reductions of most peaks are around 15 dB. Please note that the same vibration suppression apparatus was tested on other devices to be vibration-reduced having different properties, with results showing similar broad band vibration reductions.

Through the present invention, the vibratory energy is effectively trapped and damped within the ABH feature and the ABH structural element has rich distributed modes with high system loss factors due to its the unique dynamic characteristics, which can provide energy dissipation and dynamic interaction over broad frequency band.

In addition, the ABH tapered structural element has a simple and easy-to-realize geometry. Due to the above-mentioned unique dynamic characteristics, the tuning process of traditional dynamic vibration absorbers can be avoided.

The vibration suppression apparatus of the present invention can be used in any vibration system without affecting the structural integrity of the vibration system. The vibration suppression apparatus of the present invention shows great potential for vibration control, noise reduction and energy harvesting application.

The vibration suppression apparatus of the present invention has at least the following beneficial technical effects:

The acoustic black hole feature is used in the vibration absorber for vibration control;

ABH function can effectively suppress broadband vibration;

Combines the vibration control effects of dynamic vibration absorber and waveguide absorber;

The design procedure is simple, low-cost, no need (or only a few) parameter adjustments to adapt to different structures and working conditions, fewer structural components, easy assembly and connection to the main structure, and easy industrial mass production.

In one or more embodiments, the thickness decreasing of the tapered portion follows the following formula:

$$h(x)=\varepsilon \cdot x^m, m \geq 2$$

wherein, x is a coordinate along a direction in which the thickness of the tapered portion gradually decreases, ε is a coefficient, and m is an integer greater than or equal to 2.

In one or more embodiments, the broadband vibration suppression apparatus further includes a connector attached to a bottom of the uniform portion of the vibration-reduced body, so as to connect the vibration-reduced body to a device to be vibration-reduced.

In one or more embodiments, the connector is configured to connect the vibration-reduced body to the device to be vibration-reduced by strong glue, welding or bolts.

In one or more embodiments, the damping layer is attached over a top surface or a bottom surface of an extended tip of the tapered portion of the vibration-reduced body.

In one or more embodiments, the vibration-reduced body further includes a platform that continues to extend a predetermined length from the extended tip of the tapered portion with the predetermined thickness.

In one or more embodiments, the neutral axis of the tapered portion is in a linear shape or a spiral shape.

In one or more embodiments, the damping layer is multilayered.

In one or more embodiments, a plurality of vibration suppression apparatus is connected to a device to be vibration-reduced.

Through the present invention, the vibratory energy is effectively trapped and vibration-reduced by using the ABH feature and the ABH structural element has rich distributed modes with high system loss factors due to its the unique dynamic characteristics, which can provide energy dissipation and dynamic interaction over broad frequency band. In addition, an ABH tapered structural element has simple and easy-to-achieve geometry. Owing to its unique dynamic characteristics mentioned above, the tuning process of traditional dynamic vibration absorbers can be avoided. The vibration suppression apparatus according to the present invention can be used to any vibratory system without affecting its structural integrity.

The present invention can be applied to large-scale engineering problems that require vibration suppression, such as various mechanical, civil, military or consumer systems/equipment/products. More specifically, the thin-walled structure of the present invention can be widely used in transportation, aviation and aviation industries.

The specific embodiments described above further describe the purpose, technical solutions and beneficial effects of the present invention in further detail. It should be understood that the above descriptions are only specific embodiments of the present invention and are not intended to limit the scope of the present invention. The protection scope, any modification, equivalent replacement, improvement, etc. made within the spirit and principle of the present invention shall be included in the protection scope of the present invention.

What is claimed is:

1. A broadband vibration suppression apparatus using an acoustic black hole feature, comprising:
   a vibration-reduced body comprising a uniform portion of a fixed thickness and a tapered portion integrally connected with the uniform portion, the tapered portion being extended from a junction in a manner that a thickness of the tapered portion gradually decreases from the fixed thickness of the uniform portion to a predetermined thickness, wherein the uniform portion and the tapered portion being integrally connected at the junction; and
   a damping layer attached to the tapered portion of the vibration-reduced body
   wherein the apparatus further comprises a connector attached to a bottom of the uniform portion of the vibration-reduced body, so as to connect the vibration-reduced body to a device to be vibration-reduced.

2. The apparatus according to claim 1, wherein the thickness decreasing of the tapered portion follows the following formula:

$$h(x) = \varepsilon \cdot x^m, \quad m \geq 2$$

wherein x is a coordinate along a direction in which the thickness of the tapered portion gradually decreases, $\varepsilon$ is a coefficient, and m is an integer greater than or equal to 2.

3. The apparatus according to claim 1, wherein the connector is configured to connect the vibration-reduced body to the device to be vibration-reduced by strong glue, welding or bolts.

4. The apparatus according to claim 1, wherein the damping layer is attached over a top surface or a bottom surface of an extended tip of the tapered portion of the vibration- reduced body.

5. The apparatus according to claim 1, wherein the vibration-reduced body further comprising a platform that continues to extend a predetermined length from the extended tip of the tapered portion with the predetermined thickness.

6. The apparatus according to claim 1, wherein a neutral axis of the tapered portion is in a linear shape or a spiral shape.

7. The apparatus according to claim 1, wherein the damping layer is multilayered.

8. The apparatus according to claim 1, wherein a plurality of vibration suppression apparatus is connected to a device to be vibration-reduced.

9. The apparatus according to claim 1, wherein a shape of the connector comprises a rectangular solid, a cube, or an ellipsoid.

* * * * *